(12) United States Patent
Henshaw et al.

(10) Patent No.: US 12,722,801 B2
(45) **Date of Patent: *Sep. 1, 2026**

(54) AIRCRAFT BOARDING VEHICLE AND METHODS OF USE

(71) Applicants: Robert J. Henshaw, Newnan, GA (US); Robert D. Wilkey, Doraville, GA (US)

(72) Inventors: Robert J. Henshaw, Newnan, GA (US); Robert D. Wilkey, Doraville, GA (US)

( * ) Notice: Subject to any disclaimer, the term of this patent is extended or adjusted under 35 U.S.C. 154(b) by 309 days.

This patent is subject to a terminal disclaimer.

(21) Appl. No.: 18/368,468

(22) Filed: Sep. 14, 2023

(65) Prior Publication Data

US 2024/0083596 A1 Mar. 14, 2024

Related U.S. Application Data

(60) Provisional application No. 63/375,640, filed on Sep. 14, 2022.

(51) Int. Cl.
*B64F 1/31* (2006.01)

(52) U.S. Cl.
CPC .................................... *B64F 1/31* (2013.01)

(58) Field of Classification Search
CPC ... B64F 1/31; B64F 1/30; B64F 1/305; B60G 2500/30; B60G 17/0565; A61G 3/065; A61G 3/066; B60P 1/027

(Continued)

(56) References Cited

U.S. PATENT DOCUMENTS 3,537,723 A * 11/1970 Herring, Jr. ............. B60P 1/027
280/124.179
3,537,745 A * 11/1970 Herring, Jr. ............... B64F 1/31
187/214

(Continued)

FOREIGN PATENT DOCUMENTS

CN 2351322 Y 12/1999
CN 2679035 Y 2/2005

(Continued)

OTHER PUBLICATIONS

Translation of CN 112319605 (Year: 2021).*

(Continued)

*Primary Examiner* — Amy R Weisberg
*Assistant Examiner* — Veronica M Condo
(74) *Attorney, Agent, or Firm* — Mathew L. Grell, Esq.; Grell & Watson Patent Attorneys LLC

(57) ABSTRACT

An aircraft boarding vehicle to transport passengers between airport gate area and to a front door or a rear door of an airplane positioned on a tarmac of an airport without impeding ground transportation and plane traffic having a passenger platform housing, a chassis or frame to support the passenger platform housing, one or more independent drive hubs affixed to the chassis, the hubs configured to drive in either direction and turn or rotate to enable navigation of the vehicle about the tarmac, a lift system to raise and lower said passenger platform housing to match the height of the airport gate, the door of the airplane, the traverse over wing tips, and a power supply to power the one or more independent drive hubs and the lift system and thus, to speed up the turnaround process during deplaning and boarding procedures.

21 Claims, 18 Drawing Sheets

(58) Field of Classification Search
USPC .......................................... 296/179; 280/6.152
See application file for complete search history.

(56) References Cited

U.S. PATENT DOCUMENTS 3,554,320 A * 1/1971 Eggert, Jr. ................ B64F 1/31 182/98
3,606,250 A 9/1971 Sherman
3,620,565 A * 11/1971 Eggert, Jr. ................ B64F 1/31 414/495
3,650,558 A * 3/1972 Eggert, Jr. ................ B64F 1/31 285/179
3,687,321 A * 8/1972 Goodhart .................. B64F 1/32 182/69.5
3,808,626 A * 5/1974 Magill .................. B64F 1/3055 14/71.5
4,457,554 A 7/1984 Fuisz et al.
4,490,869 A 1/1985 Morin
5,205,697 A 4/1993 Getty et al.
5,595,470 A * 1/1997 Berkey ................... B60P 1/025 414/539
7,575,197 B2 8/2009 McCoskey et al.
7,614,585 B2 11/2009 McCoskey et al.
9,085,375 B2 7/2015 Cornell et al.
9,193,460 B2 11/2015 Laudrain
9,963,841 B2 * 5/2018 Nacke .................. B60G 17/016
10,443,262 B2 * 10/2019 Evans ..................... B60P 3/007
10,519,614 B2 12/2019 Glatfelter et al.
2006/0022090 A1 2/2006 McCoskey et al.
2008/0217475 A1 * 9/2008 Allison .................. B64D 11/00 244/103 S
2015/0291233 A1 * 10/2015 Dames ................ B60B 35/1054 280/638
2022/0105750 A1 * 4/2022 Ishii ........................ B66F 9/063
2023/0286344 A1 * 9/2023 Chung ..................... B60G 3/14

FOREIGN PATENT DOCUMENTS

CN 112319605 A * 2/2021 ........... B60G 17/015
CN 112793803 5/2021
CN 214029192 8/2021
DE 2245974 4/1974
DE 10130387 A1 * 1/2003 ........... B64C 1/0683
EP 0050643 A1 5/1982
FR 2754780 4/1998
GB 2091183 A 7/1982
JP 2007030677 A 2/2007
JP 5264185 B2 8/2013
WO 2001088274 A1 11/2001
WO 2002053454 A1 11/2002

OTHER PUBLICATIONS

International Search Authority, “International Search Report” and “Written Opinion”, PCT/US2023/032797, mailed Dec. 29, 2023.
“Mobile lounge” WikipediA, Published on Dec. 4, 2023, https://en.wikipedia.org/wiki/Mobile_lounge. Accessed Jan. 17, 2024.

* cited by examiner

AIRCRAFT BOARDING VEHICLE AND METHODS OF USE

CROSS-REFERENCE TO RELATED APPLICATIONS

To the full extent permitted by law, the present United States Non-provisional Patent Application hereby claims priority to and the full benefit of, U.S. Provisional Application No. 63/375,640, filed on Sep. 14, 2022, entitled "Aircraft Boarding Vehicle and Methods of Use", which is incorporated by reference herein in its entirety.

FIELD OF THE DISCLOSURE

The present disclosure is directed to a transport vehicle. More specifically, the present disclosure is directed to a tarmac transport vehicle to expedite boarding and deplaning of passengers from commercial aircraft.

BACKGROUND

Worldwide air passenger traffic has increased dramatically from one billion passengers in 1980 to four billion in 2019. This increase has congested airports worldwide. This increase of passengers at the airport has resulted in large groupings of passengers in the terminal waiting to board their plane, congestion in the terminal walkways due to bottleneck during deplaning and boarding procedures via the jet bridge JB.

More specifically, large groupings of passengers in the terminal waiting to board their plane often creates a bottlenecks in walkways. One disadvantage or drawback to this approach is that it restricts other passengers trying to get to other gates, terminals, and baggage claim. Moreover, most countries are dealing with aging populations and these individuals require additional wheelchair and motorized transport vehicles to assist with travel through the airport. Another disadvantage or drawback to this approach is that these vehicles create additional bottlenecks in walkways while attempting to navigate around large groupings of passengers in the terminal waiting to board their plane and again restricting other passengers trying to get to other gates, terminals, and baggage claim.

Furthermore, congestion in the terminal due to bottleneck during deplaning and boarding procedures has been slowed due to high volume of passengers being loaded into larger planes through a single jet bridge or stair system leading to a single front door of the aircraft. One disadvantage or drawback to this approach is that aircraft often have more doors for entry than just the front door.

Therefore, it is readily apparent that there is a recognizable unmet need for an aircraft boarding vehicle and methods of use that may be configured to address at least some aspects of the problems discussed above common to airport congestion.

SUMMARY

Briefly described, in an example embodiment, the present disclosure may overcome the above-mentioned disadvantages and may meet the recognized need for an aircraft boarding vehicle to transport passengers between airport gate area and to a front door or a rear door of an airplane positioned on a tarmac of an airport without impeding ground transportation and plane traffic having a passenger platform housing, a chassis or frame to support the passenger platform housing, one or more independent drive hubs affixed to the chassis, the hubs configured to drive in either direction and turn or rotate to enable navigation of the vehicle about the tarmac, a lift system to raise and lower said passenger platform housing to match the height of the airport gate, the door of the airplane, the traverse over wing tips, and a power supply to power the one or more independent drive hubs and the lift system.

Accordingly, in one aspect, the present disclosure may be configured to provide a plurality of independent drive hubs to enable the vehicle to drive in any direction and make extremely tight turns to navigate the crowded tarmac area between the airport gate and the aircraft.

Accordingly, in another aspect, the present disclosure may be configured to provide a lift system that raises and lowers the passenger platform housing above the ground to different heights, leaving space for other tarmac vehicles to drive underneath the platform, to raise and lower the platform's entry/exit doors to match the height of the airport gate door and front, rear or other boarding door of the aircraft.

Accordingly, in another aspect, the present disclosure may be configured to provide a set of sensors and/or cameras, or the like to enable the aircraft boarding vehicle to detect all its surroundings and autonomously (or with minimal operator input) determine an optimal path between the gate and aircraft for the vehicle to traverse. Moreover, these sensor systems also inform the safety features of the vehicle, dynamically adjusting its route and drive speed to prevent collisions and avoid hazards during operation.

In another exemplary embodiment of the aircraft boarding vehicle and methods of use to transport passengers between airport gate area and to a front door or a rear door of an aircraft positioned on a tarmac of an airport without impeding ground transportation vehicles and airplane traffic, includes a passenger platform having a frame to support the passenger platform, a lift mast assembly configured to raise and lower the passenger platform to match a height of the airport gate area and the door of the airplane, the lift system positioned between the frame on one end and a carriage base on the other, one or more turning drive hubs affixed to the carriage base, the turning drive hubs configured to drive in either direction and turn 360 degrees to enable navigation about the tarmac, and a power supply to power the one or more turning drive hubs and the lift mast assembly.

In another exemplary embodiment of the method of transporting passengers between airport gate area and to a front or forward door or a rear or aft door of an airplane positioned on a tarmac of an airport without impeding ground transportation and plane traffic, including providing an aircraft boarding vehicle having a passenger platform, a chassis or frame to support the passenger platform, one or more independent drive hubs affixed to the chassis, the hubs configured to drive in either direction and turn to enable navigation of the tarmac, a lift system to raise and lower the passenger platform to match the height of the airport gate and the door of the airplane, and a power supply to power the one or more independent drive hubs and the lift system, positioning a side of the aircraft boarding vehicle adjacent the airport gate area, loading the passengers into the aircraft boarding vehicle, calculating a path from the airport gate area to an aft door of the airplane, autonomously traversing the path by the aircraft boarding vehicle to position an end door of the aircraft boarding vehicle toward the aft door of the airplane, changing an elevation of the aircraft boarding vehicle to match the a height of the end door of the aircraft boarding vehicle to the aft door of the airplane, abutting the aircraft boarding vehicle to the aft door of the airplane, and loading the passengers form the aircraft boarding vehicle through the aft door of the airplane.

In another exemplary embodiment of the A method of transporting passengers between airport gate area and to a front door or a rear door of an airplane positioned on a tarmac of an airport without impeding ground transportation and plane traffic, including providing an aircraft boarding vehicle having a passenger platform, a chassis or frame to support the passenger platform, one or more independent drive hubs affixed to the chassis, the hubs configured to drive in either direction and turn to enable navigation of the tarmac, a lift system to raise and lower the passenger platform to match the height of the airport gate and the door of the airplane, and a power supply to power the one or more independent drive hubs and the lift system, positioning an end of the aircraft boarding vehicle adjacent an aft door of the airplane, loading the passengers into the aircraft boarding vehicle, calculating a path from the aft door of the airplane to the airport gate area, autonomously traversing the path by the aircraft boarding vehicle to position a side door of the aircraft boarding vehicle toward a door of the airport gate area, changing an elevation of the aircraft boarding vehicle to match the a height of the door of the airport gate area, abutting the aircraft boarding vehicle to the door of the airport gate area, and deboarding the passengers from the aircraft boarding vehicle through the door of the airport gate area.

A feature of the present disclosure may include an autonomous or semi-autonomous vehicle designed to facilitate comfortable and expedient boarding and deplaning of passengers from commercial aircraft.

A feature of the present disclosure may include deployment of the aircraft boarding vehicle that requires only minimal modifications to existing airport gate architecture, and is designed to minimize interference with ground operations on the tarmac.

A feature of the present disclosure may include safely ferrying passengers between the airport gate and a door of the aircraft using sensors and guidance technologies and/or artificial intelligence (AI) technology to navigate a path across the tarmac while avoiding people and equipment in motion on the tarmac.

A feature of the present disclosure may include to provide an elevated stance and minimal ground space occupied by the vehicle allows most ground operations vehicles to operate around and underneath the vehicle without issue and may also enable parking of ground operations vehicles thereunder during nonuse of the aircraft boarding vehicle.

A feature of the present disclosure may include the ability to dramatically speed up the turnaround process during deplaning and boarding procedures. This is particularly true for single aisle aircraft by enabling much higher passenger throughput utilizing jet bridge for deplaning and boarding procedures via the front door of the aircraft while simultaneously utilizing the aircraft boarding vehicle for deplaning and boarding procedures via the aft or other door of the aircraft.

A feature of the present disclosure may include the ability to have the aircraft boarding vehicle serve as the sole means of aircraft boarding when aircraft are loaded away from the terminal. Many airlines throughout the world board via stairs with aircraft parked far from the terminal building. This of course exposes passengers to the weather and requires them to climb stairs which slows the boarding process and makes it very difficult for passengers with reduced mobility. One or more aircraft boarding vehicles may be utilized for deplaning and boarding procedures of aircraft boarding when aircraft are loaded away from the terminal.

A feature of the present disclosure may include when docked at the gate, the aircraft boarding vehicle may act as an extension of the gate area or as an exclusive lounge space, to expand gate area capacity in either case.

A feature of the present disclosure may include the ability to have the aircraft boarding vehicle utilized aft door loading and unloading of passengers between airport terminal and to and from an aft door of a single isle aircraft or other aircraft in an effort to reduce turnaround time of the aircraft.

A feature of the present disclosure may include the ability to have the aircraft boarding vehicle may be utilized as a mobile lounge capable of docking proximate terminal to offload passengers from the terminal and out of the aisle ways of the terminal.

A feature of the present disclosure may include the ability to have the aircraft boarding vehicle may be capable of vertical lift and extension (such as shaft, single or end lift system or 4 bar link at each wheel) to enable ground vehicles to drive and park thereunder so as not to impede ground transportation travel and parking space as well as lift of the main cabin to match door height during ingress and egress.

A feature of the present disclosure may include the ability to have the aircraft boarding vehicle may be configured with one or more independently steerable or tight turn radius or zero radius turn steering mechanisms to enable precise maneuverability thereof.

A feature of the present disclosure may include the ability to have the aircraft boarding vehicle may be configured with one or more independent drive mechanisms (such as electric drive unit) to propel and transport thereof.

A feature of the present disclosure may include the ability to have the aircraft boarding vehicle may be configured with autonomous driving (such as LIDAR, cameras, sensors, Rf, wire or sensor guided, or the like & AI technology—guidance system to navigate a path across the tarmac).

These and other features of an aircraft boarding vehicle and methods of use will become more apparent to one skilled in the art from the prior Summary and following Brief Description of the Drawings, Detailed Description of exemplary embodiments thereof, and Claims when read in light of the accompanying Drawings or Figures.

BRIEF DESCRIPTION OF THE DRAWINGS

The present an aircraft boarding vehicle and methods of use will be better understood by reading the Detailed Description of the Preferred and Selected Alternate Embodiments with reference to the accompanying drawing Figures, in which like reference numerals denote similar structure and refer to like elements throughout, and in which.

Figure 1:
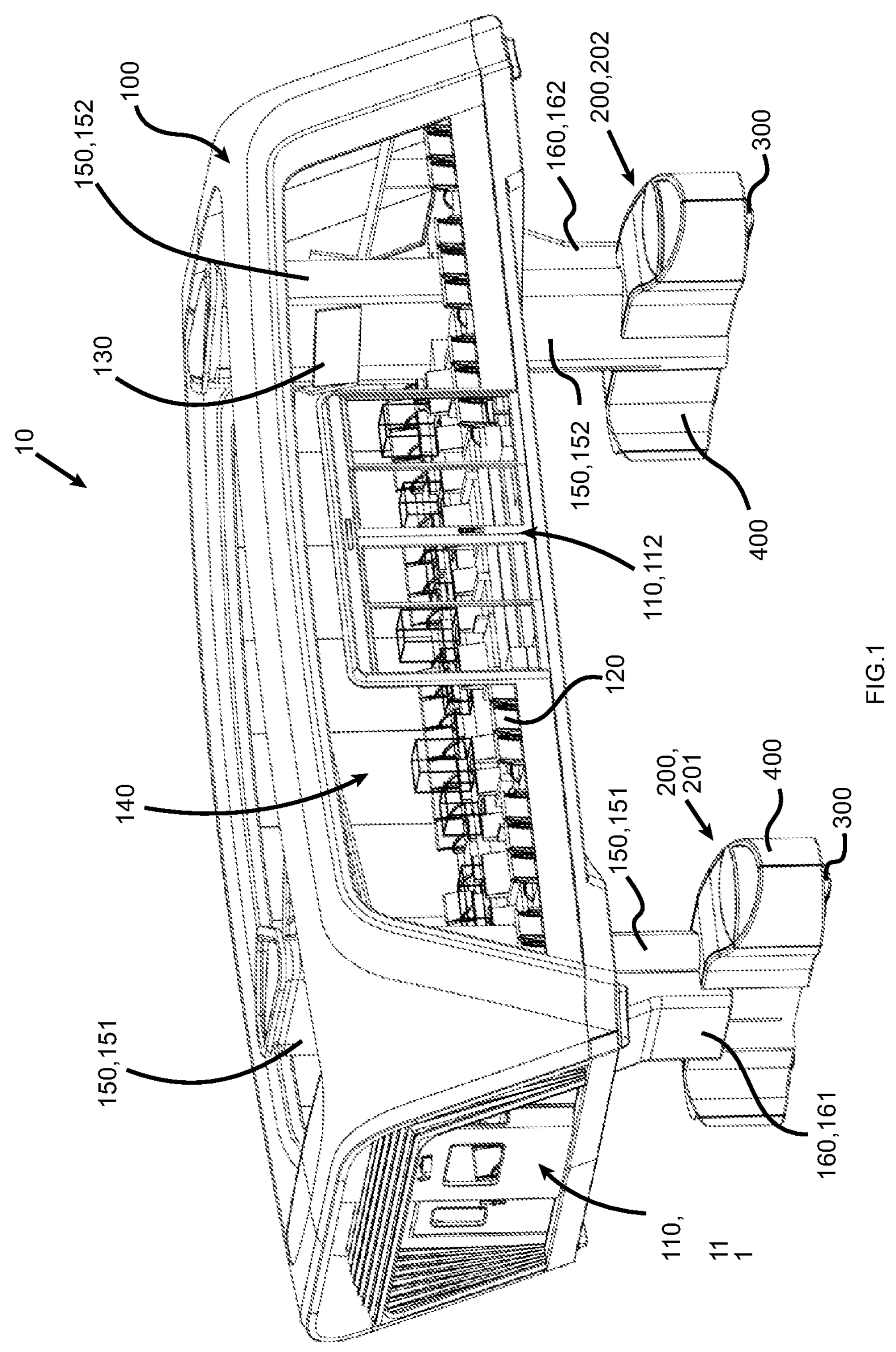
FIG. 1 is a perspective side view of the aircraft boarding vehicle with passenger platform shown in a transport or mid position according to select embodiments of the instant disclosure.
Figure 2A:
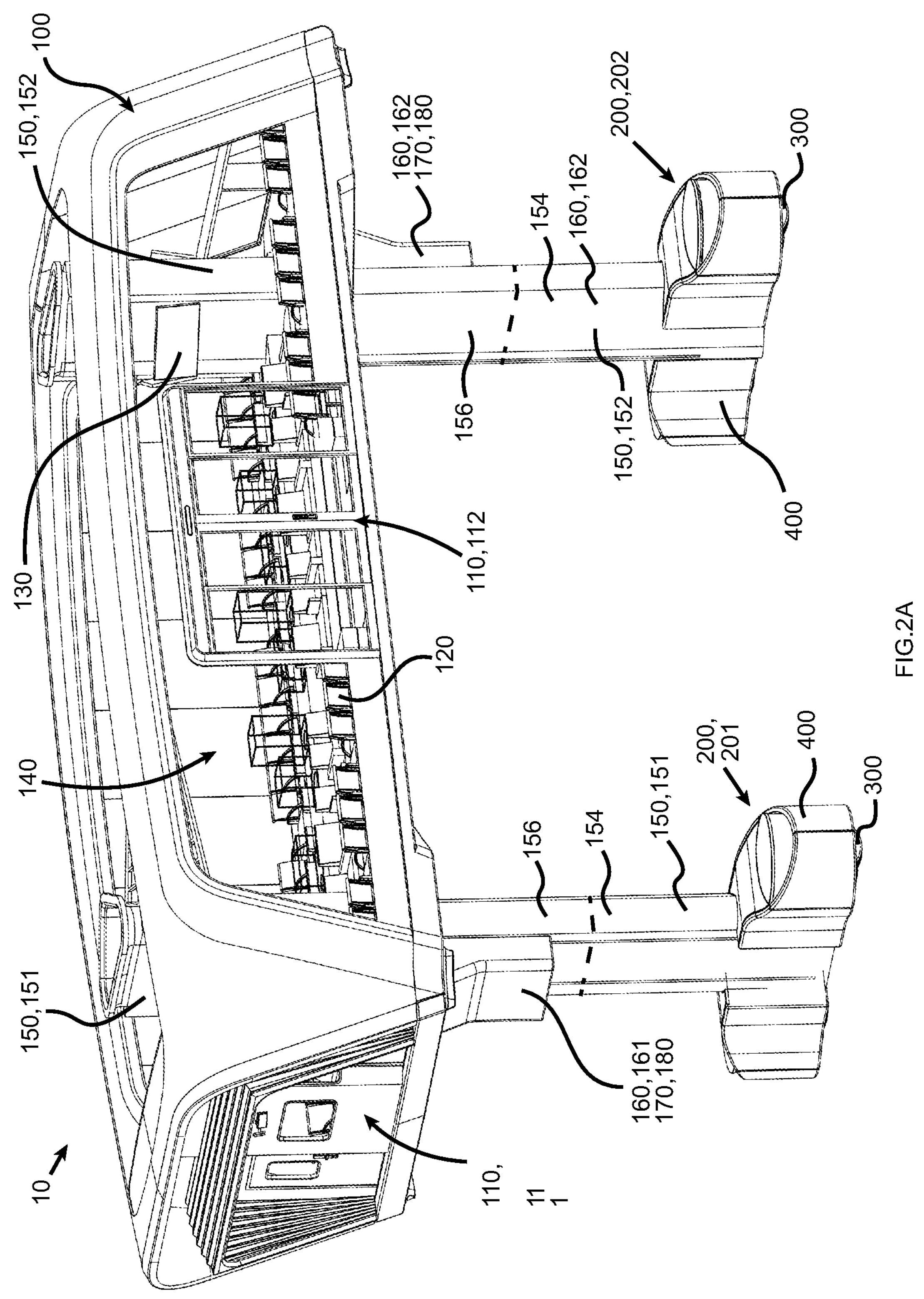
FIG. 2A is a perspective side view of the aircraft boarding vehicle with passenger platform shown in a raised position according to select embodiments of the instant disclosure.
Figure 2B:
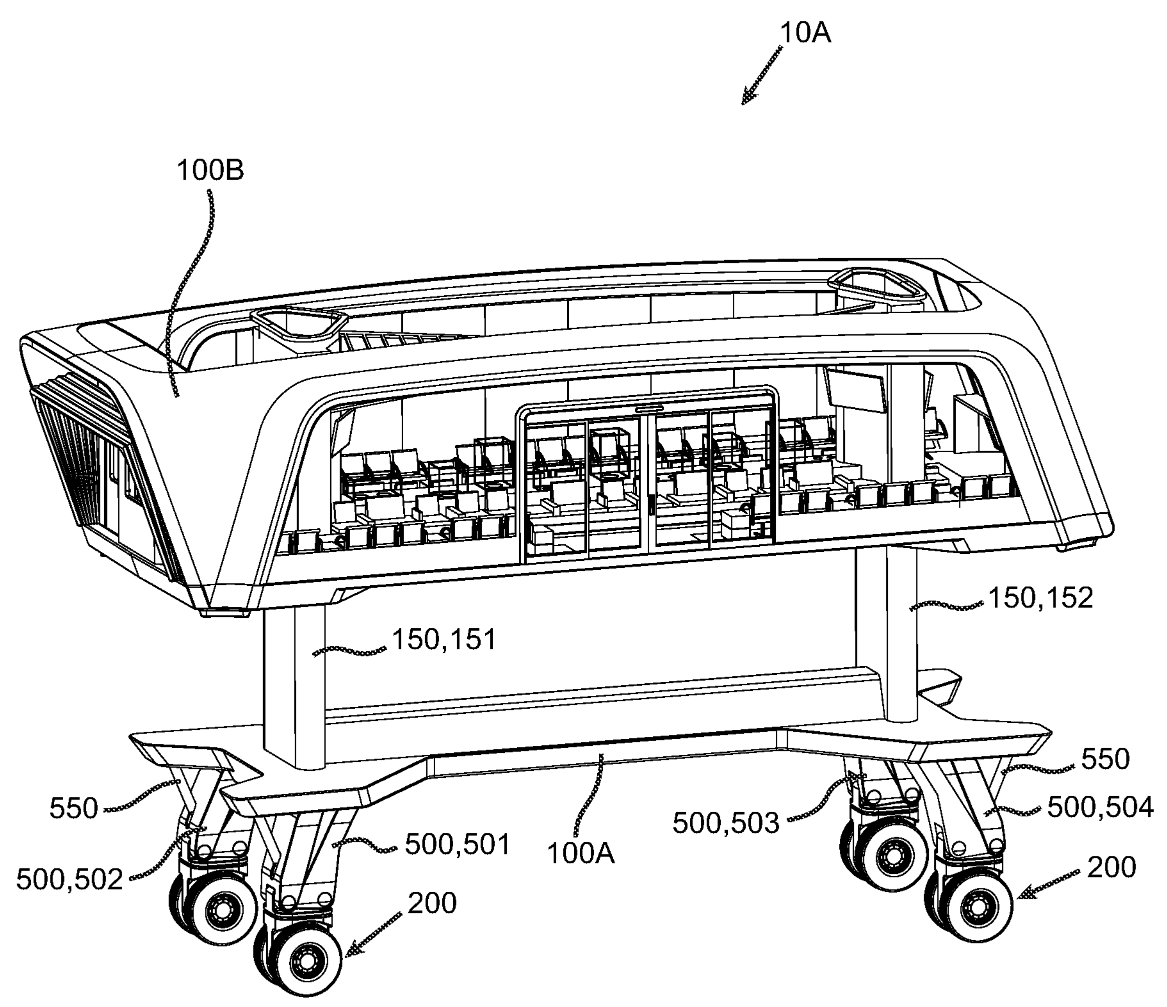
FIG. 2B is a perspective side view of the aircraft boarding vehicle with passenger platform shown in a raised position according to an alternate embodiment of the instant disclosure.
Figure 3:
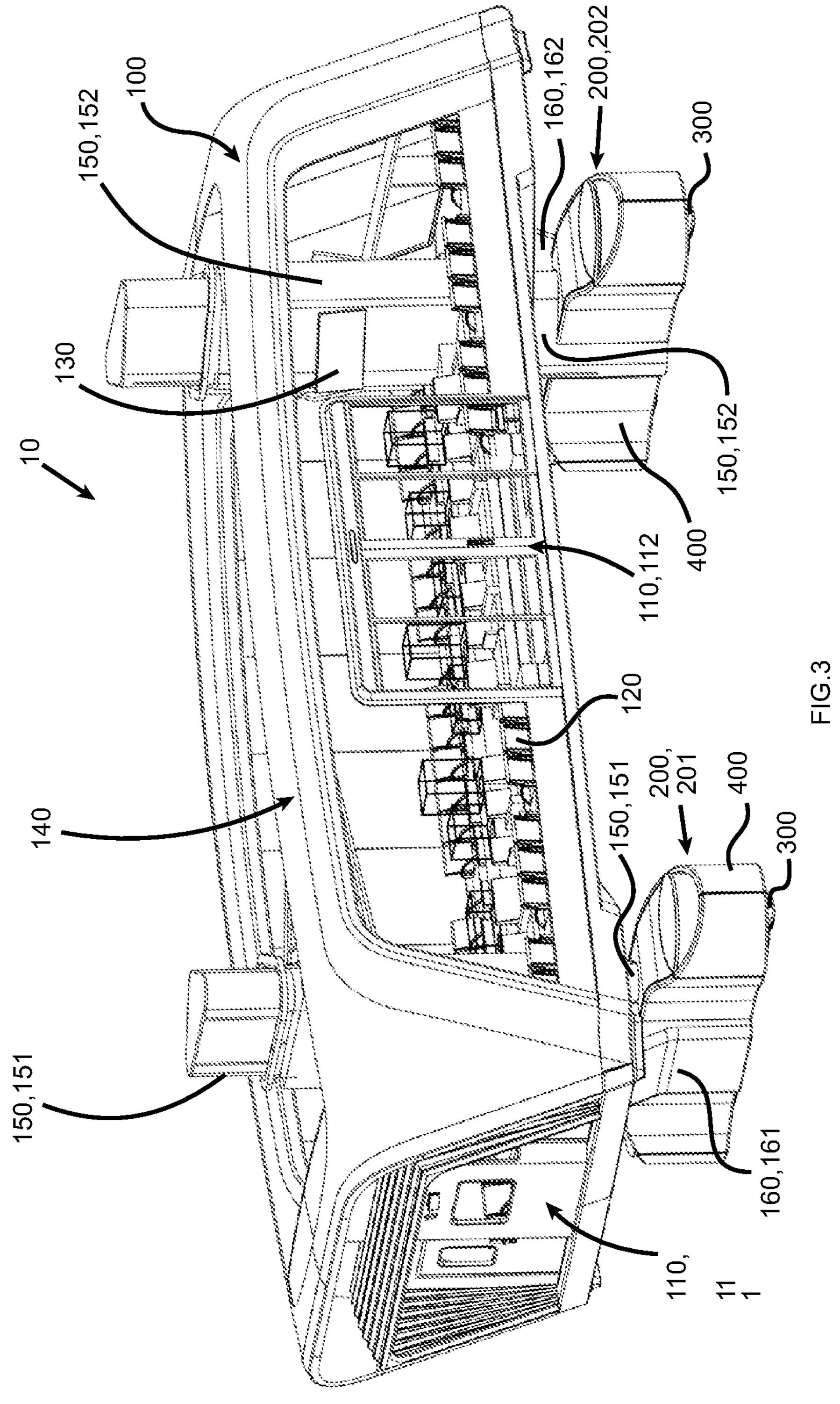
FIG. 3 is a perspective side view of the aircraft boarding vehicle with passenger platform shown in a lowered position according to select embodiments of the instant disclosure.
Figure 4:
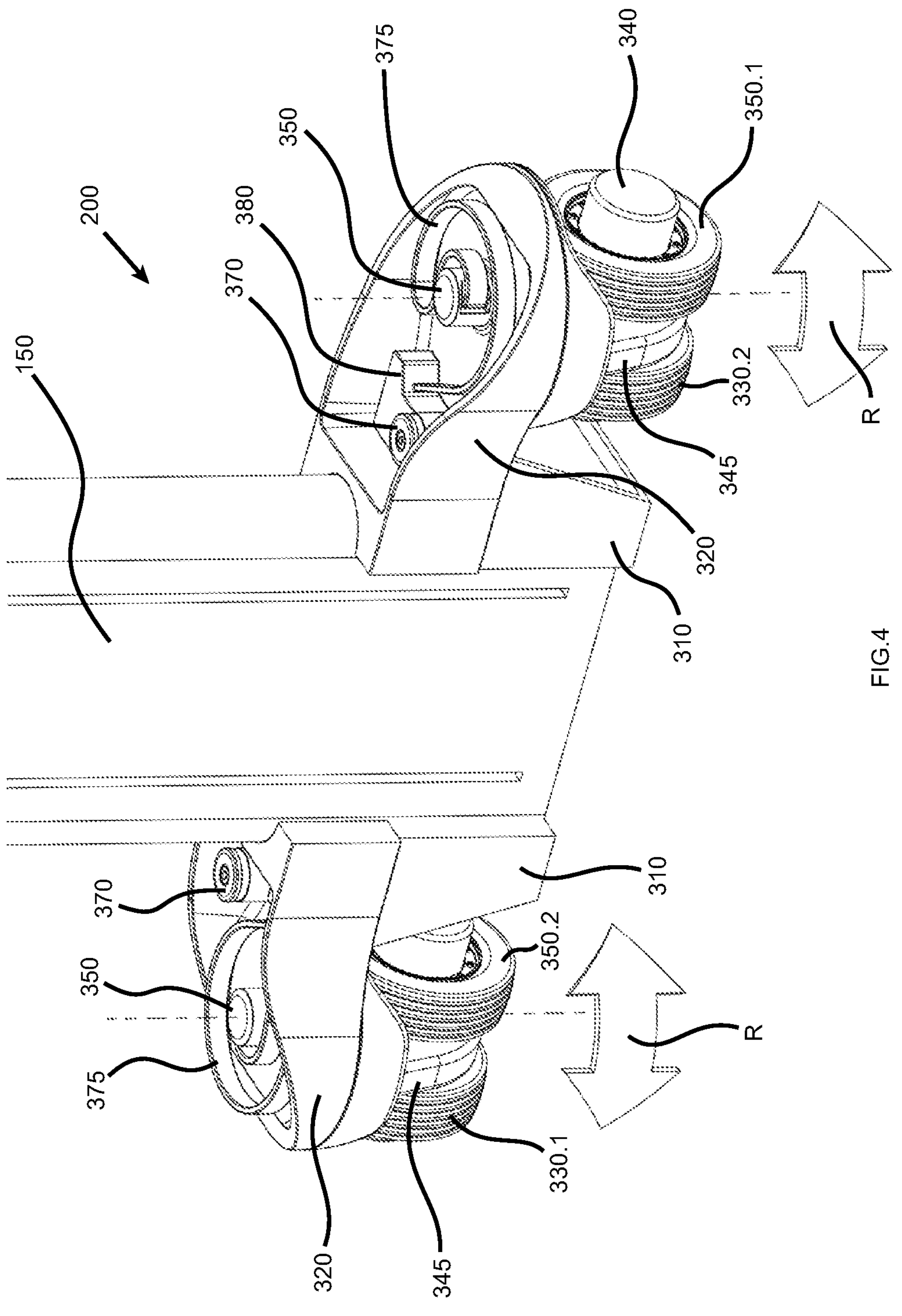
FIG. 4 is a perspective front view of the aircraft boarding vehicle drive mechanism with turning drive hub according to select embodiments of the instant disclosure.
Figure 5:
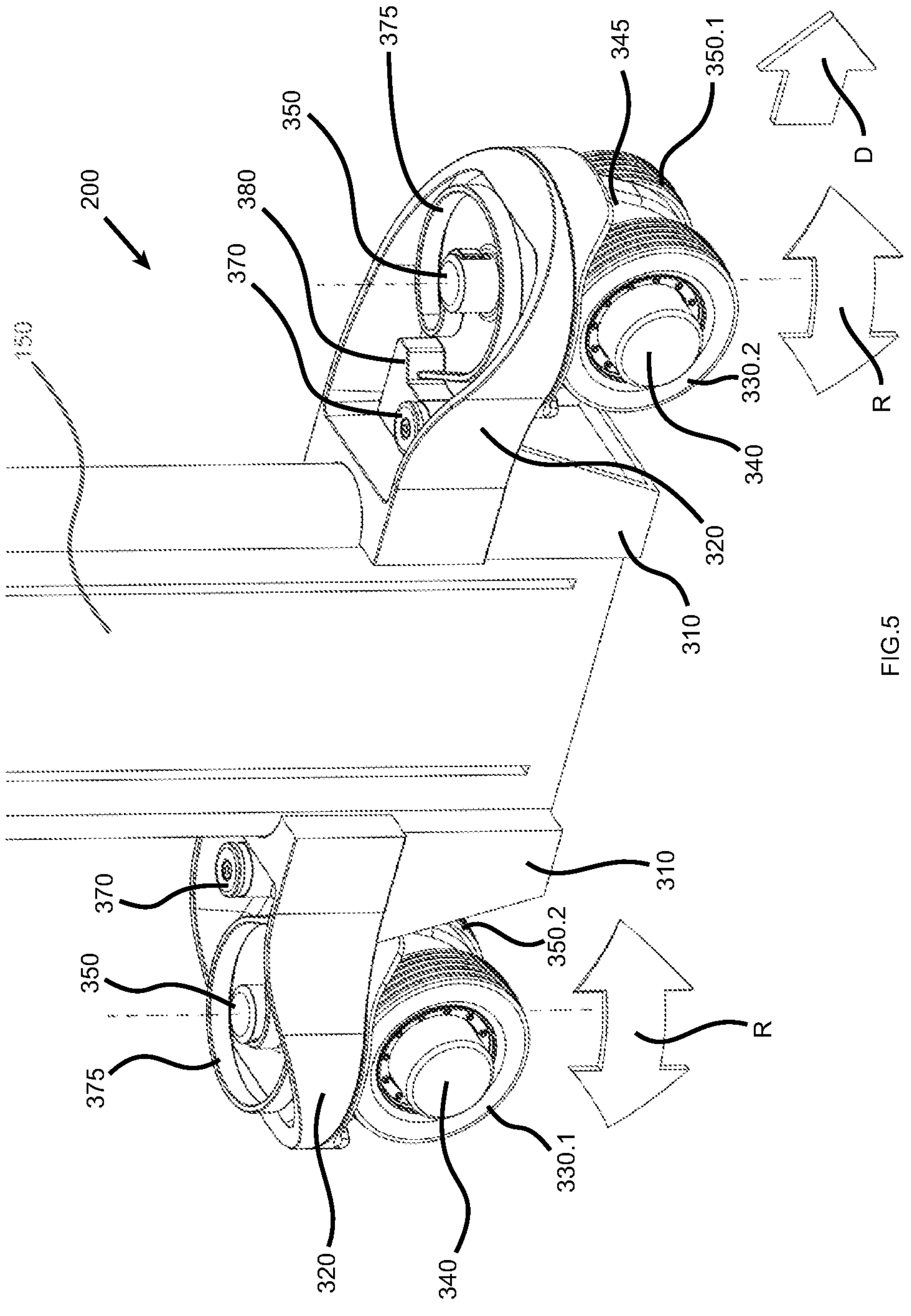
FIG. 5 is a perspective front view of the aircraft boarding vehicle drive mechanism with turning drive hub according to select embodiments of the instant disclosure, showing rotation and direction of travel.
Figure 6:
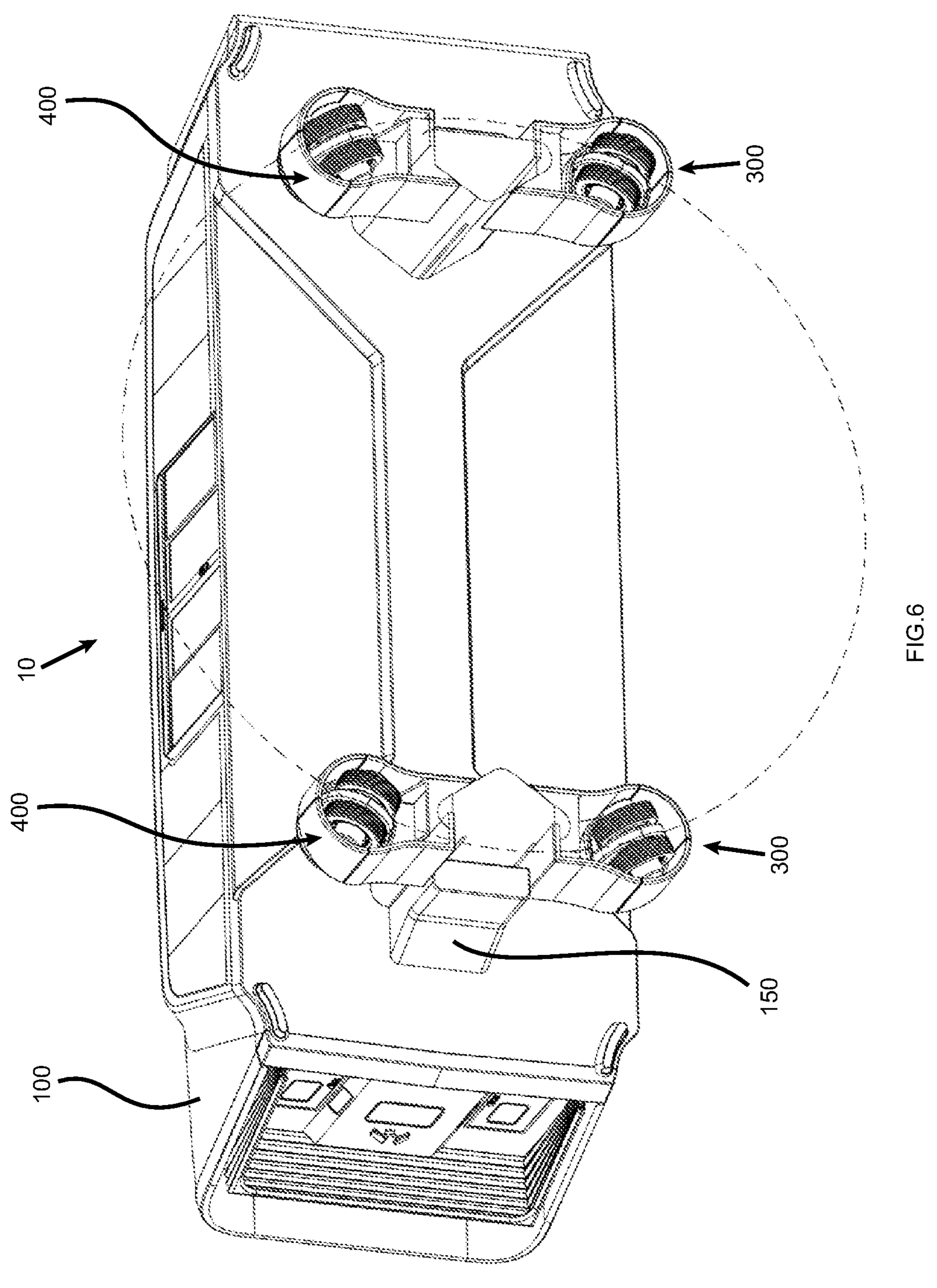
FIG. 6 is a perspective underside view of the aircraft boarding vehicle drive mechanism with turning drive hub according to select embodiments of the instant disclosure, showing rotation to spin aircraft boarding vehicle.
Figure 7:
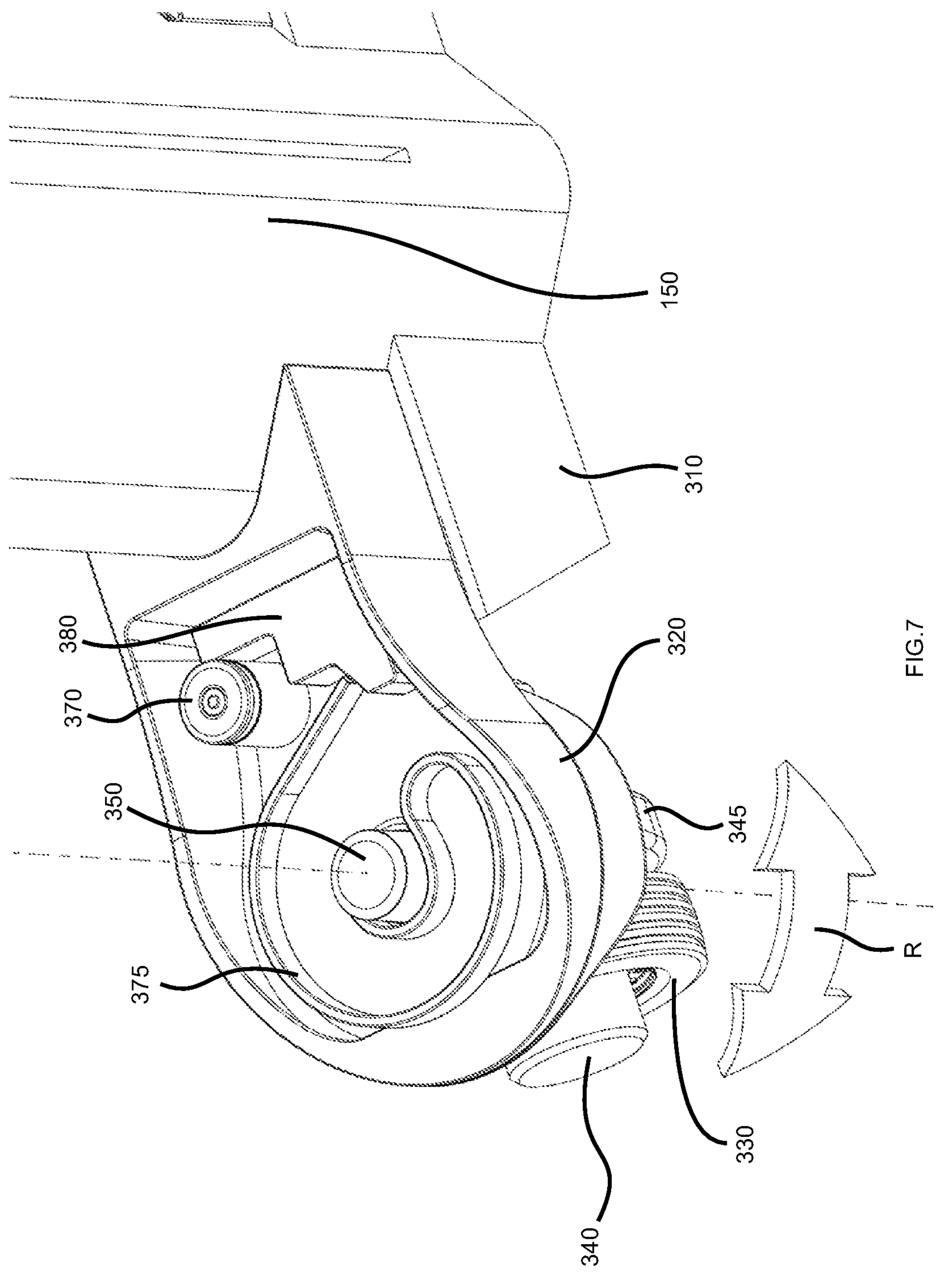
FIG. 7 is a perspective top view of the turning drive hub according to select embodiments of the instant disclosure, showing rotation.
Figure 8:
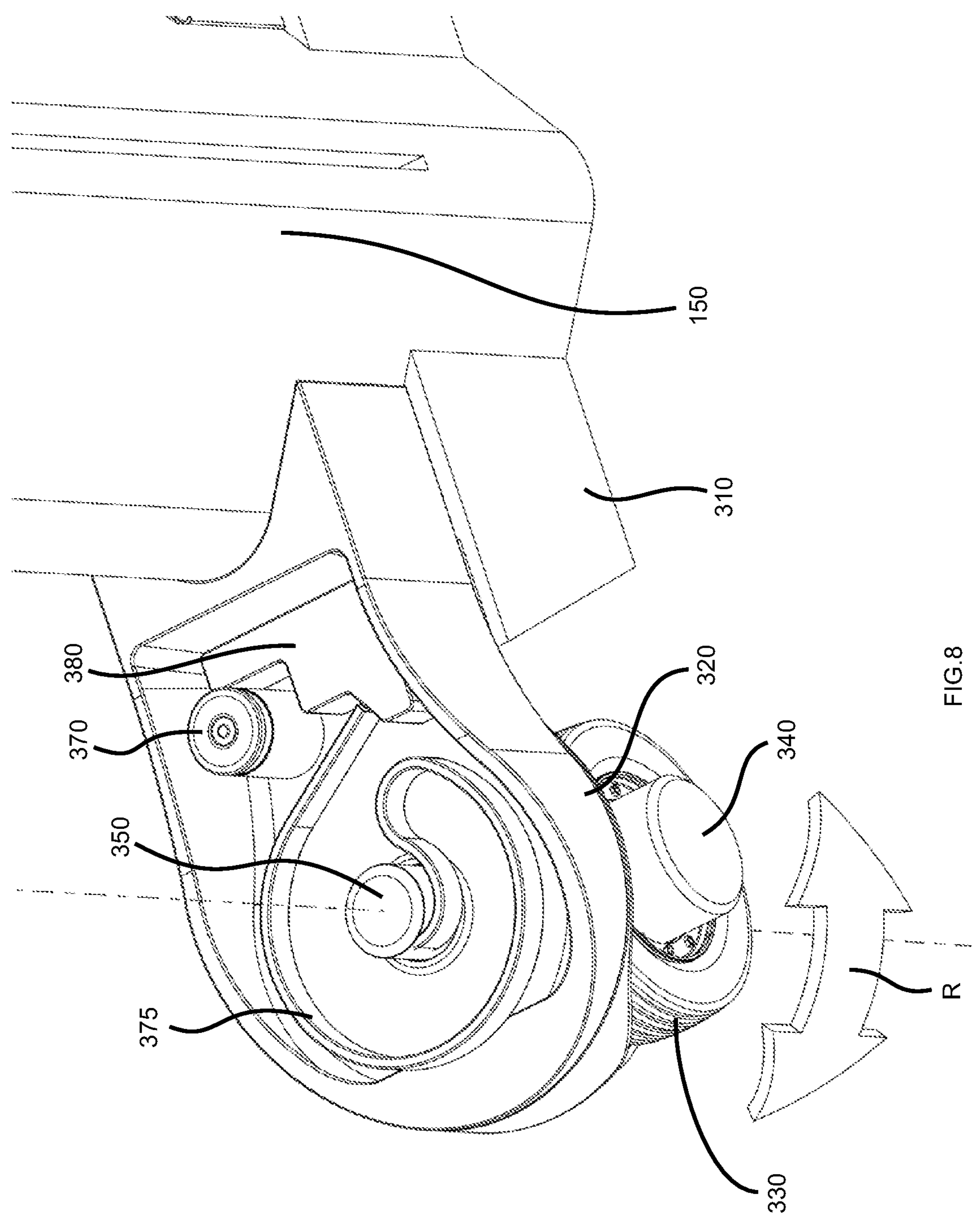
FIG. 8 is a perspective top view of the turning drive hub according to select embodiments of the instant disclosure, showing rotation.
Figure 9:
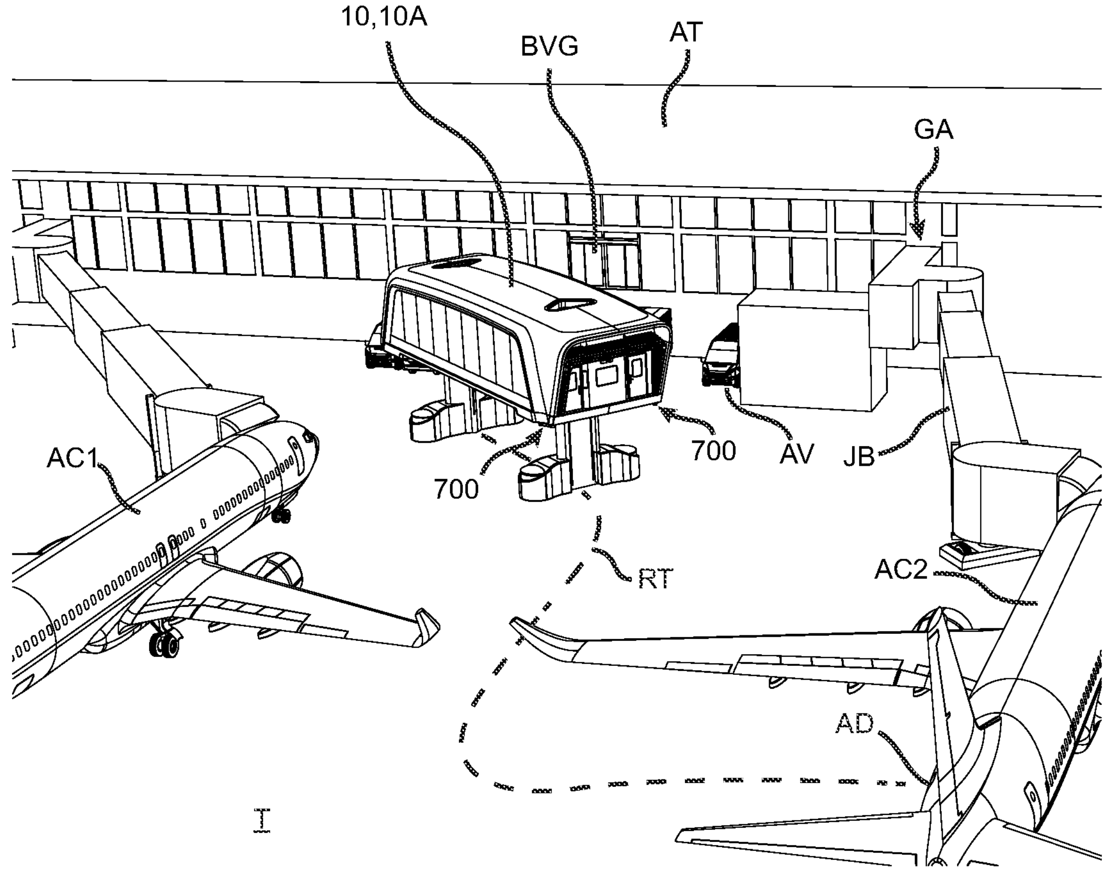
FIG. 9 is a perspective view of aircraft boarding vehicle according to select embodiments of the instant disclosure, shown departing airport terminal.
Figure 10:
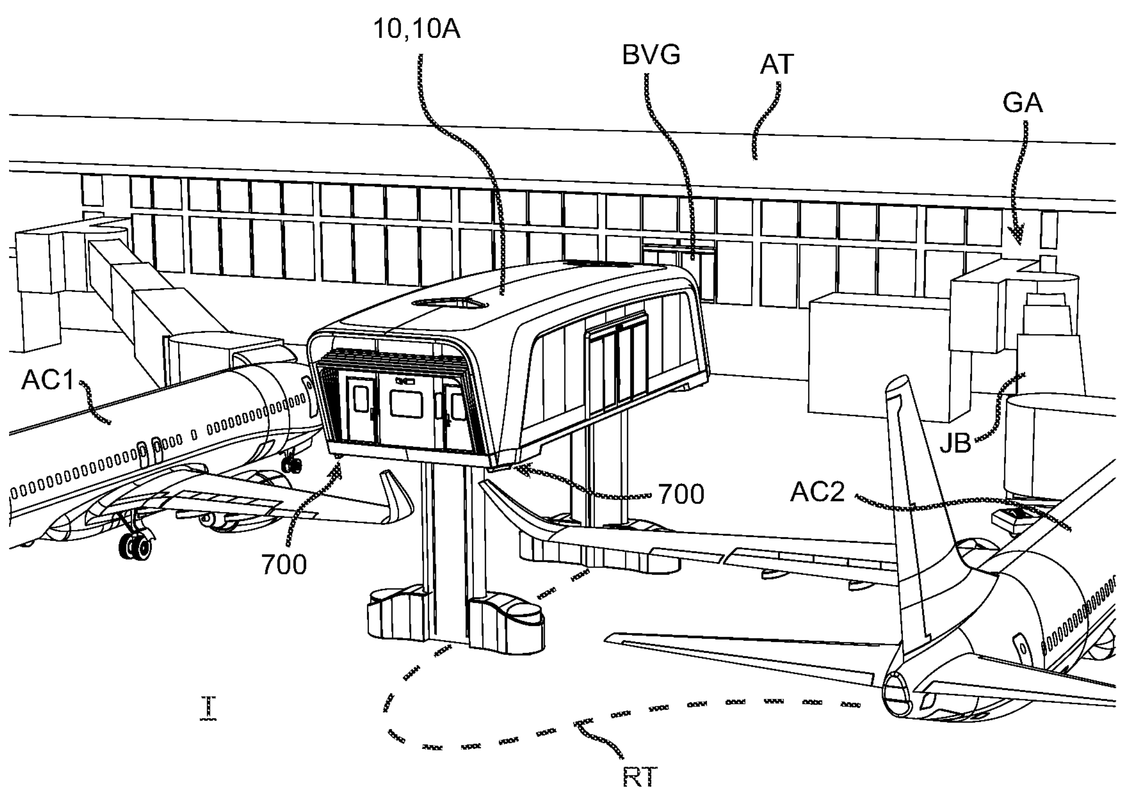
FIG. 10 is a perspective view of aircraft boarding vehicle according to select embodiments of the instant disclosure, shown fully raised traversing between two aircraft positioned proximate airport terminal.
Figure 11:
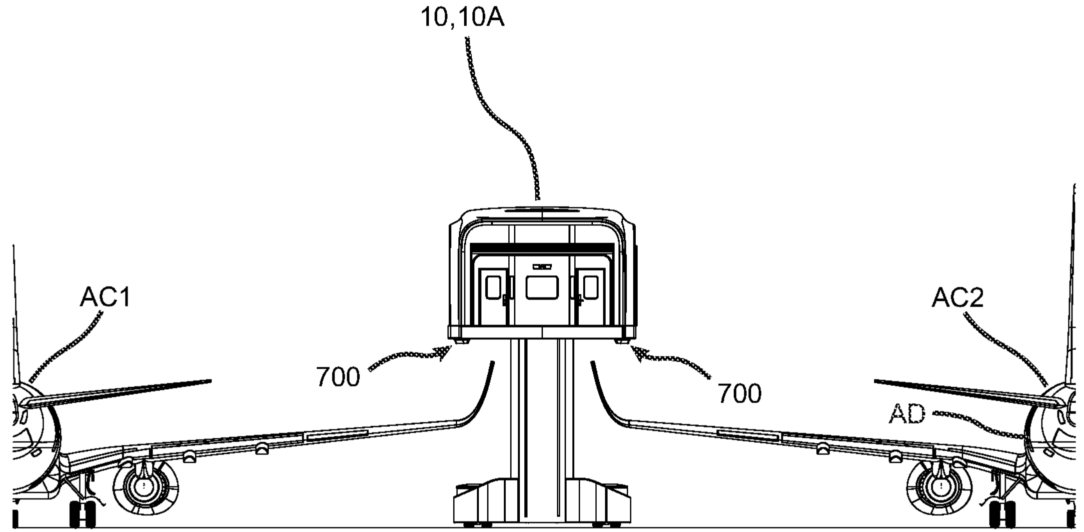
FIG. 11 is a perspective front view of aircraft boarding vehicle according to select embodiments of the instant disclosure, shown fully raised traversing between two aircraft positioned proximate airport terminal.
Figure 12:
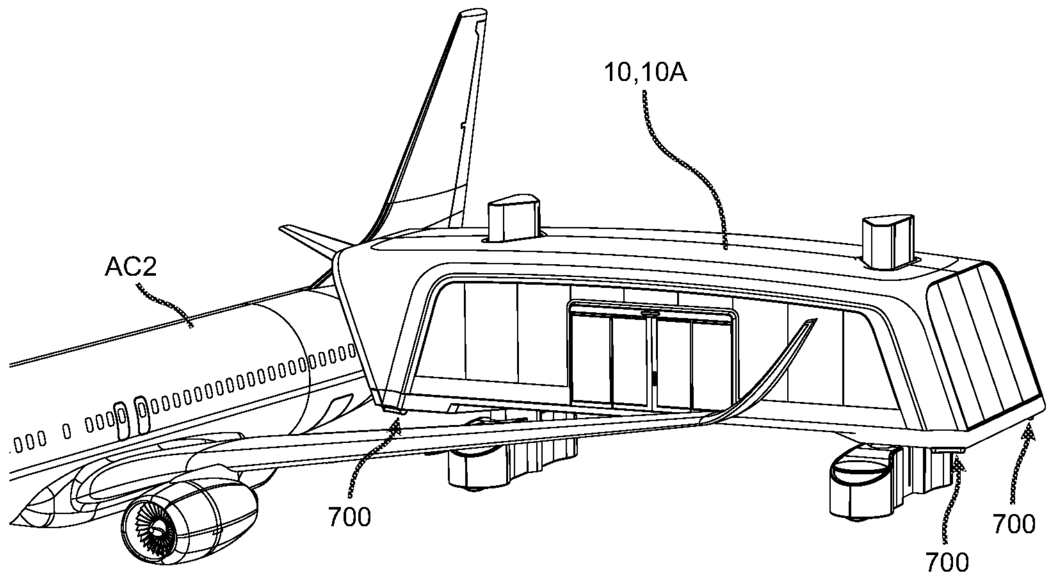
FIG. 12 is a perspective side view of aircraft boarding vehicle according to select embodiments of the instant disclosure, shown docked to aft door of aircraft.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

In describing the exemplary embodiments of the present disclosure, as illustrated in the figures, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples, and are merely examples among other possible examples.

With respect to the above description then, it is to be realized that the optimum dimensional relationships, to include variations in size, materials, shape, form, position, movement mechanisms, function and manner of operation, assembly and use, are intended to be encompassed by the present disclosure.

Referring now to FIGS. 1, 2A, 2B, and 3, by way of example, and not limitation, there is illustrated an example embodiment of aircraft boarding vehicle 10, 10A, according to this select embodiment. Aircraft boarding vehicle 10 may be utilized as a passenger transport and more specifically, as an extension of the gate or as an exclusive lounge space, expanding gate (a lounge space to expand the airport gate area or capacity) capacity and/or to increase passenger throughput during deplaning and boarding procedures. Aircraft boarding vehicle 10, 10A may include a chassis 200 or frame 200 and housing, and in combination, such as passenger platform 100 to accommodate passengers in a climate controlled space 140 with heating and air conditioning and power systems. Passenger platform 100 typically is constructed of sturdy materials such as steel, aluminum, or other sturdy material and is designed to withstand the weight and ensure stability during the lifting process.

Moreover, passenger platform 100 may include a variety of, and a plurality of passenger seating 120 options to enable passengers to sit or lounge comfortably while waiting and/or transporting to and from the gate area while waiting to board or deplane the aircraft.

Furthermore, passenger platform 100 may include entertainment systems 130, such as audio and visual systems to entertain passengers while waiting and/or transporting to and from the gate area while waiting to board or deplane the aircraft.

Additionally, passenger platform 100 may include one or more entrance and exit doors 110, such as, aircraft loading door 111 positioned on either end or both ends of passenger platform 100 to enable passenger deplaning and boarding between passenger platform 100 and aircraft A. In addition, passenger platform 100 may include gate/terminal loading door 112 positioned on either side or both sides of passenger platform 100 to enable passenger to transition between passenger platform 100 and gate area GA.

It is contemplated herein that other entrance and exit doors 110 configurations may be utilized herein by one of ordinary skill in the art without deviating from the present disclosure.

It is further contemplated herein that exterior architecture and interior layout of passenger platform 100 may be customized to fit the preferences of the operating airline or airport.

It is contemplated herein that passenger platform 100 may be configured in different shapes, sizes, window configurations, seat configurations, and entertainment systems by one of ordinary skill in the art without deviating from the present disclosure.

Referring again to FIGS. 1, 2A, 2B, and 3, by way of example, and not limitation, there is illustrated an example embodiment of aircraft boarding vehicle 10, according to this select embodiment. Aircraft boarding vehicle 10, 10A may include a lift system, such as lift mast assembly 150, 151, 152 a mechanical assembly designed to raise and lower passenger platform 100 vertically from one level to another. Lift mast assembly 150 consists of several essential components that work together to facilitate safe and efficient lifting operations and may be positioned between passenger platform 100 or its frame and one or more independent drive hubs. Lift mast assembly 150 are configured having hydraulic cylinders, compressed air, cable actuated drives or through ball screw linear drives.

Moreover, lift mast assembly 150 may include a t-shaped carriage base 100A or a horizontal support, such as aircraft boarding vehicle drive mechanism 200 responsible for supporting and moving passenger platform 100. Aircraft boarding vehicle drive mechanism 200 is preferably attached to lift mast assembly 150 and provides stability and control during the lifting operation.

Furthermore, lift mast assembly 150 may include lifting mechanism 160/161/162 configured for raising and lowering passenger platform 100. It is contemplated herein that lifting mechanism 160/161/162 may vary depending on the specific type of lift system required, including hydraulic cylinders, electric motors, pneumatic systems, or other systems known to one of ordinary skill in the art as lift mechanisms. Lifting mechanism 160/161/162 generate the necessary force to lift passenger platform 100 and control its movement.

Still furthermore, lift mast assembly 150 may include control system, such as guidance system 170 configured to ensures safe and precise operation of lift system, such as lifting mechanism 160/161/162 and aircraft boarding vehicle 10. Guidance system 170 may include controls such as buttons, switches, or control panels, wireless connectivity and the like that allow users to initiate and control the lifting process or to automate such operations. Moreover, safety features like emergency stop buttons and limit switches are also integrated into guidance system 170 to prevent accidents and ensure operational reliability. Also, guidance system 170 may incorporate various safety features to protect users and prevent accidents, such as safety sensors, overload protection, emergency lowering mechanisms, and safety brakes. These features are essential to minimize risks and ensure the safe operation of the lift system.

Still furthermore, lift mast assembly 150 may include a power source to operate the lifting mechanism, such as power supply 180. Power supply 180 may be electricity (from solar or grid), hydraulic fluid, or compressed air, depending on the type of lift system. Moreover, power supply 180 may include a rechargeable onboard battery. Adequate power supply is crucial to ensure consistent and reliable lifting performance.

Alternatively, lift mast assembly 150 may be configured as a telescope type lift system having two or more telescopic arms 154, 156, which consists of multiple sections or stages that can be extended or retracted from within the other. Preferably, telescopic arms 154, 156 sections are usually made of durable materials such as steel or aluminum. By adjusting the length of telescopic arms 154, 156, the lift system can achieve various elevation heights, making it highly adaptable for different applications.

Overall, a lift system is a complex assembly of components that work in harmony to raise a platform vertically. It is designed with safety, efficiency, and reliability in mind to meet various lifting requirements in industries such as construction, warehousing, transportation, and accessibility.

Lift mast assembly 150 raises passenger platform 100 above the ground, leaving space for other vehicles to drive underneath, and raising the entry/exit doors to match the height of the airport gate door and aft boarding door of the aircraft.

Referring again to FIG. 2B, by way of example, and not limitation, there is illustrated an example embodiment of aircraft boarding vehicle 10A, according to this select embodiment. Aircraft boarding vehicle 10A may be modified to include a base, such as platform 100A to support vehicle drive mechanism 200 in each corner and to support lift mast assembly 150, 151, 152 to raise and lower environmentally controlled (climate control system) passenger compartment 100B. Moreover, aircraft boarding vehicle 10A may utilize an additional mechanical assembly, such as bar linkages 500, 501, 502, 503, 504, each having hydraulic drive 550, hinged thereto platform 100A on one end and vehicle drive mechanism 200 on the other designed to raise and lower platform 100A vertically from one level to another.

Four bar linkages 500, 501, 502, 503, 504 units may be located at the four corners of aircraft boarding vehicle 10A and may work in unison with lift mast assembly 150 to raise the aircraft boarding vehicle 10A to the desired height to board the aircraft.

Referring now to FIGS. 4-8, by way of example, and not limitation, there is illustrated an example embodiment of aircraft boarding vehicle drive mechanism 200, according to this select embodiment. Aircraft boarding vehicle drive mechanism 200 may be utilized to transport, drive, or propel passenger platform 100 about airport tarmac T. Aircraft boarding vehicle drive mechanism 200 may include a plurality and more specifically four independent turning drive hub 300 capable of working in unison to drive passenger platform 100 in any direction D and make extremely tight turns to navigate the crowded area between the airport gate and the aircraft on airport tarmac T. Turning drive hub 300 are mechanical devices designed to provide a full range of rotation R, 360+ degrees, allowing the attached equipment or vehicle, such as passenger platform 100 to maneuver easily in any direction D.

Moreover, turning drive hub 300 may include housing/axel bracket and bearings 345 utilized to reduce friction and ensure smooth rotation R of drive wheels 330.1/330.2. Axel bracket and bearings 345 are typically sealed to protect against dust, dirt, and moisture, ensuring long-lasting performance. Housing/axel bracket of turning drive hub 300 encloses and protects the internal components. Gears/Seals/Drive Mechanism 340 may include precision-engineered gears employed to transfer power from the drivetrain, Drive Mechanism, to the hub, enabling rotation R. These gears are often made from durable materials such as steel or hardened alloys to withstand heavy loads and maintain reliability. Seals may be utilized to prevent contaminants from entering the hub. Seals are incorporated at critical points to maintain lubrication and prolong the lifespan of the internal components. These seals help to maintain optimal performance and minimize maintenance requirements. The drive mechanism within the hub transfers rotational force from the drivetrain to drive wheels 330.1/330.2. It is contemplated herein that depending on the specific application, this mechanism can vary and may involve gears, belts, chains, direct drive, or other mechanisms.

It is contemplated herein that these parts are usually constructed from sturdy materials like aluminum or cast iron to provide structural integrity and resist wear and tear.

Furthermore, turning drive hub 300 may include rotational drive axis 350 to enable up to 360 degree turning drive hub 300 with unrestricted rotation R in all directions, allowing for precise maneuverability and providing enhanced control and versatility in applications such as maneuverability and mobility about airport tarmac T to aircraft and back from gate area GA, and more.

Still furthermore, turning drive hub 300 may include steering motor 370 having drive controller 380 where steering motor 370 engages energy chain 375 affixed to rotational drive axis 350 to rotate turning drive hub 300 and enable 360+ degree turning drive hub 300 with unrestricted rotation R in all directions, allowing for precise maneuverability and providing enhanced control and versatility in applications such as maneuverability and mobility about airport tarmac T to aircraft and back from gate area GA, and more.

Lastly, turning drive hub 300 may be releasably affixed to lifting mast 150 via drive mounting frame 320 may be removably affixed mounting block 310 configured as platform extension thereof lifting mast 150. These turning drive hubs 300 often feature versatile mounting options, allowing them to be easily integrated into different systems or vehicles. This flexibility enables seamless installation and integration with existing equipment or structures.

It is contemplated herein that turning drive hub 300 facilitate smooth and precise rotation in various applications. Through the utilization of high-quality bearings, gears, housing, seals, and drive mechanisms, these hubs enable unrestricted movement in all directions D, ensuring efficient maneuverability and optimal performance. Moreover, turning drive hub 300 enables aircraft boarding vehicle 10 to drive in any direction and make extremely tight turns to navigate the crowded area between the airport gate and the aircraft AC.

Referring now to FIGS. 9-12, by way of example, and not limitation, there is illustrated an example embodiment of aircraft boarding vehicle 10, 10A, according to this select embodiment. Aircraft boarding vehicle 10, 10A may traverse a path, such as route RT about airport tarmac T to aircraft AC and back from terminal boarding vehicle gate BVG avoiding contact with airport vehicles AV, personnel, with precise maneuverability and providing enhanced control and versatility to traverse between aircraft AC, such as aircraft1 AC1 and aircraft2 AC2 whether maned, remote or autopilot.

An automated aircraft boarding vehicle 10, 10A with sensors, cameras, and the like to assist with navigation of aircraft boarding vehicle 10, 10A is a specialized vehicle designed to dramatically speed up the turnaround process during deplaning and boarding procedures. This vehicle is equipped with advanced technology that enables it to autonomously navigate airport tarmac T, perform various tasks, and enhance overall safety and efficiency.

Moreover, aircraft boarding vehicle 10, 10A may be equipped with guidance system 700 having a variety of sensors 700 to provide precise information about the vehicles surroundings, helping it navigate the airport tarmac T and avoid any obstacles and other vehicles, aircraft, or personnel on the tarmac, ensuring safe operations and preventing potential collisions, including but not limited to: LiDAR system 700 use laser technology to accurately measure distances and create detailed maps of the airport tarmac T and communicate such information to drive controller 380. Radar system 700 use radio waves to detect objects and monitor their movements. Infrared sensors 700 detect heat signatures and help identify hotspots where vehicles or equipment may be located. Camera systems 700 equipped with high-resolution cameras that capture real-time video footage of airport tarmac T. These cameras provide visual information to the operators or integrated artificial intelligence (AI) systems, allowing for remote monitoring, analysis, and decision-making. Shrouded sensing skirt 400 configured to cover pairs of turning drive hub 300 or aircraft boarding vehicle drive mechanism 200 and utilized to sense contact between aircraft boarding vehicle drive mechanism 200 and an object on airport tarmac T wherein drive controller 380 will immediately stop and or reverse drive hub 300.

In addition to the sensors, the vehicle may incorporate advanced features and technologies within drive controller 380, such as: GPS navigation system 700 utilizes GPS technology to precisely determine aircraft boarding vehicle 10, 10A location on airport tarmac T and follow predefined route(s) RT or instructions. Communication systems 700 equipped with wireless communication capabilities, enabling it to receive instructions from the control center or communicate with other vehicles and personnel on airport tarmac T. Collision avoidance systems 700 may utilize data from the sensors 700 to detect potential collision risks and take appropriate actions to avoid accidents. This may include automatic braking, adjusting its trajectory, or alerting nearby vehicles or personnel. Autonomous operation 700 where aircraft boarding vehicle 10, 10A may be programmed to operate autonomously, following predefined route(s) RT and performing tasks without direct human intervention. However, it may also offer manual control options for operators to take over if necessary.

Overall, an automated airport tarmac vehicle with sensors and cameras plays a crucial role in enhancing safety, efficiency, and maintenance operations on airport tarmac T to expedite boarding and deplaning of passengers from commercial aircraft. Moreover, its advanced technology and capabilities provide real-time data and situational awareness, enabling smooth operations and reducing the risk of incidents or accidents.

Furthermore, a series of sensors and cameras 700 enable the aircraft boarding vehicle to detect all its surroundings and autonomously (or with minimal operator input) determine an optimal path, such as route RT between terminal boarding vehicle gate BVG and aircraft. These sensor systems 700 also inform the safety features of the vehicle, dynamically adjusting its route R and drive speed to prevent collisions and avoid hazards during operation, raise or lower passenger platform 100 to avoid contact with aircraft AC, and dock aircraft boarding vehicle 10, 10A to aircraft rear door ARD.

It is contemplated herein that sensors 700 may be positioned anywhere on aircraft boarding vehicle 10, 10A.

Figure 13A:
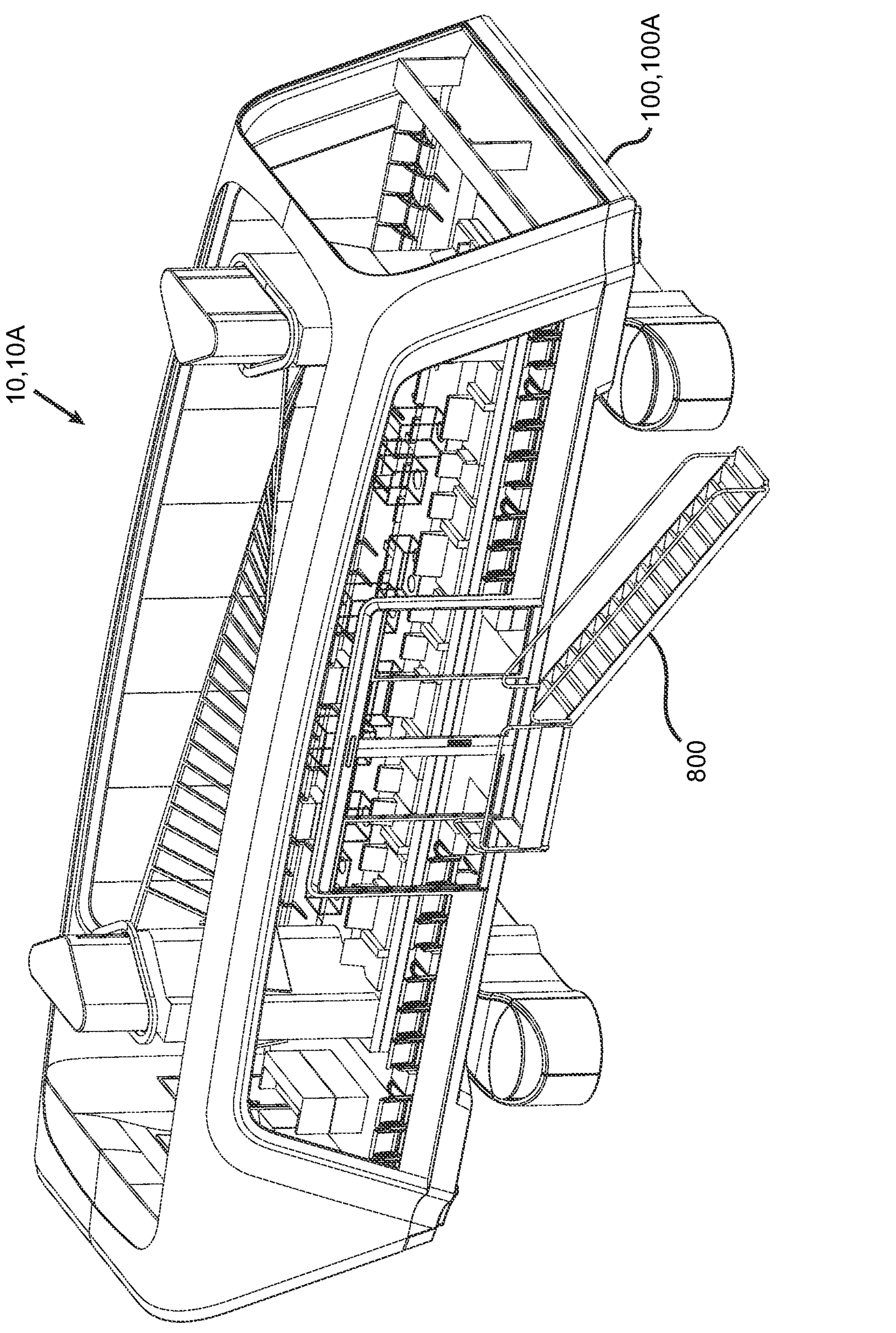
FIG. 13A is a perspective side view of aircraft boarding vehicle according to select embodiments of the instant disclosure, shown in a lowered position with a tarmac passenger loading and unloading staircase extended therefrom.
Figure 13B:
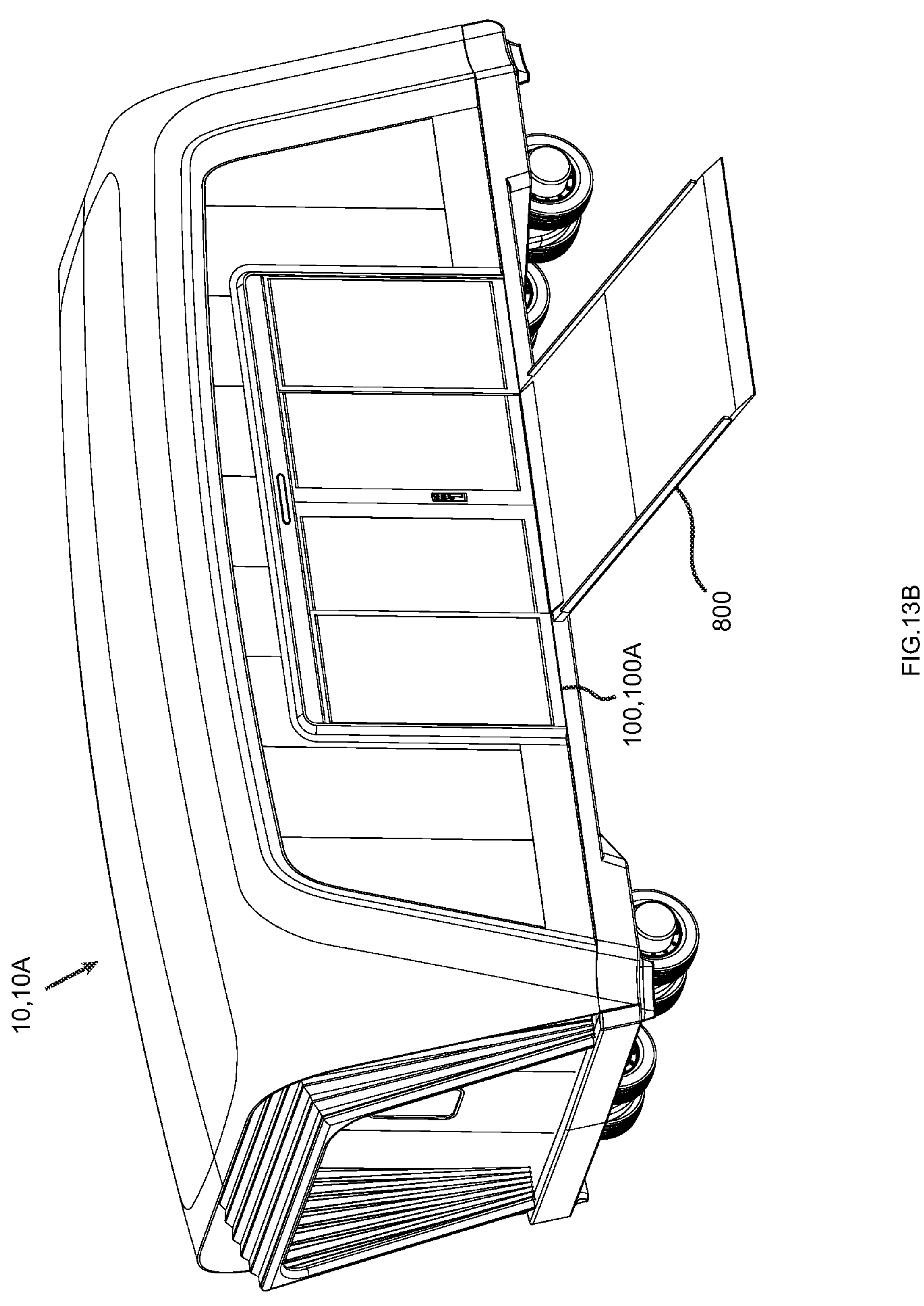
FIG. 13B is a perspective side view of aircraft boarding vehicle according to select embodiments of the instant disclosure, shown in a lowered position with a tarmac passenger loading and unloading ramp extended therefrom.

Referring now to FIGS. 13A and 13B, by way of example, and not limitation, there is illustrated an example embodiment of aircraft boarding vehicle 10, 10A, according to this select embodiment. Aircraft boarding vehicle 10, 10A may include a ramp or a staircase, such as tarmac passenger loading and unloading device 800 extendable, deployable (deployable from said passenger platform 100), or hinged from passenger platform 100 or platform 100A and may be lowered to the ground level so that passengers can board without needing to step up or take a flight of stairs into passenger platform 100 or passenger lounge via retractable tarmac passenger loading and unloading device 800.

Figure 14:
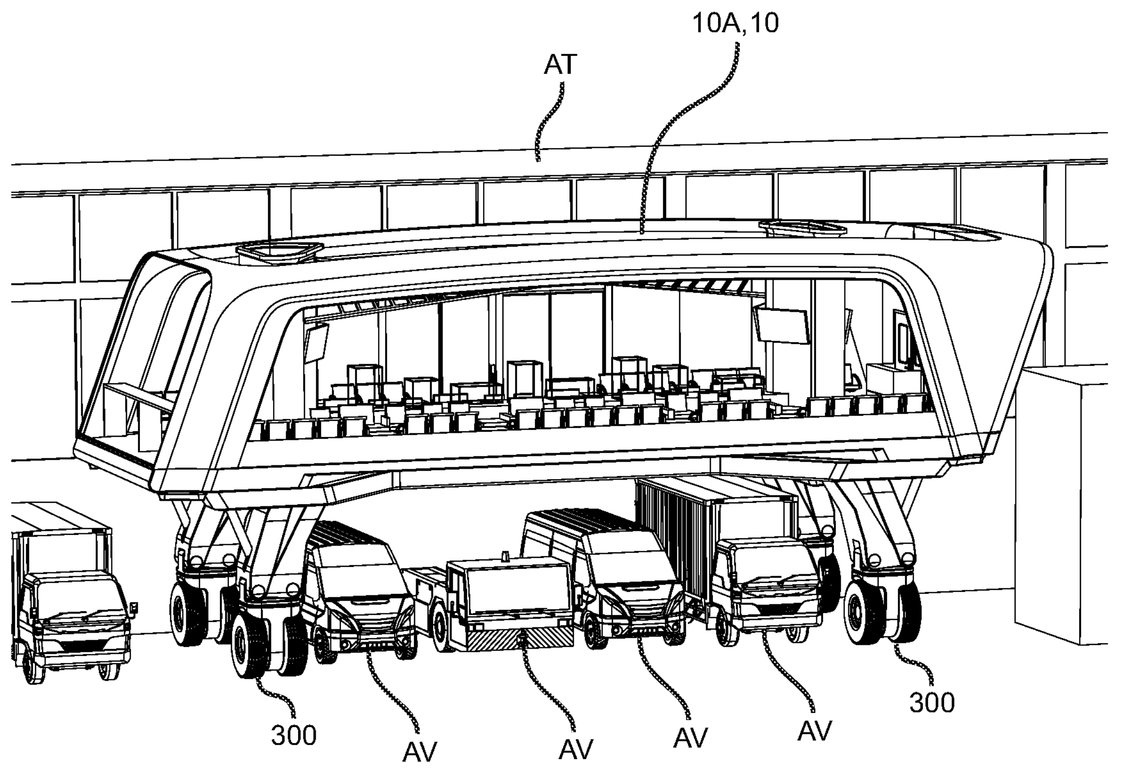
FIG. 14 is a perspective side view of the aircraft boarding vehicle with passenger platform shown in a raised position according to an alternate embodiment of the instant disclosure, shown with airport vehicles parked thereunder.

Referring now to FIG. 14, by way of example, and not limitation, there is illustrated an example embodiment of aircraft boarding vehicle 10, 10A, according to this select embodiment. Aircraft boarding vehicle 10, 10A may be positioned proximate airport terminal TE or elsewhere on airport tarmac T and in a partial raised position (raises) to enable space saving parking of airport vehicle thereunder.

Figure 15:
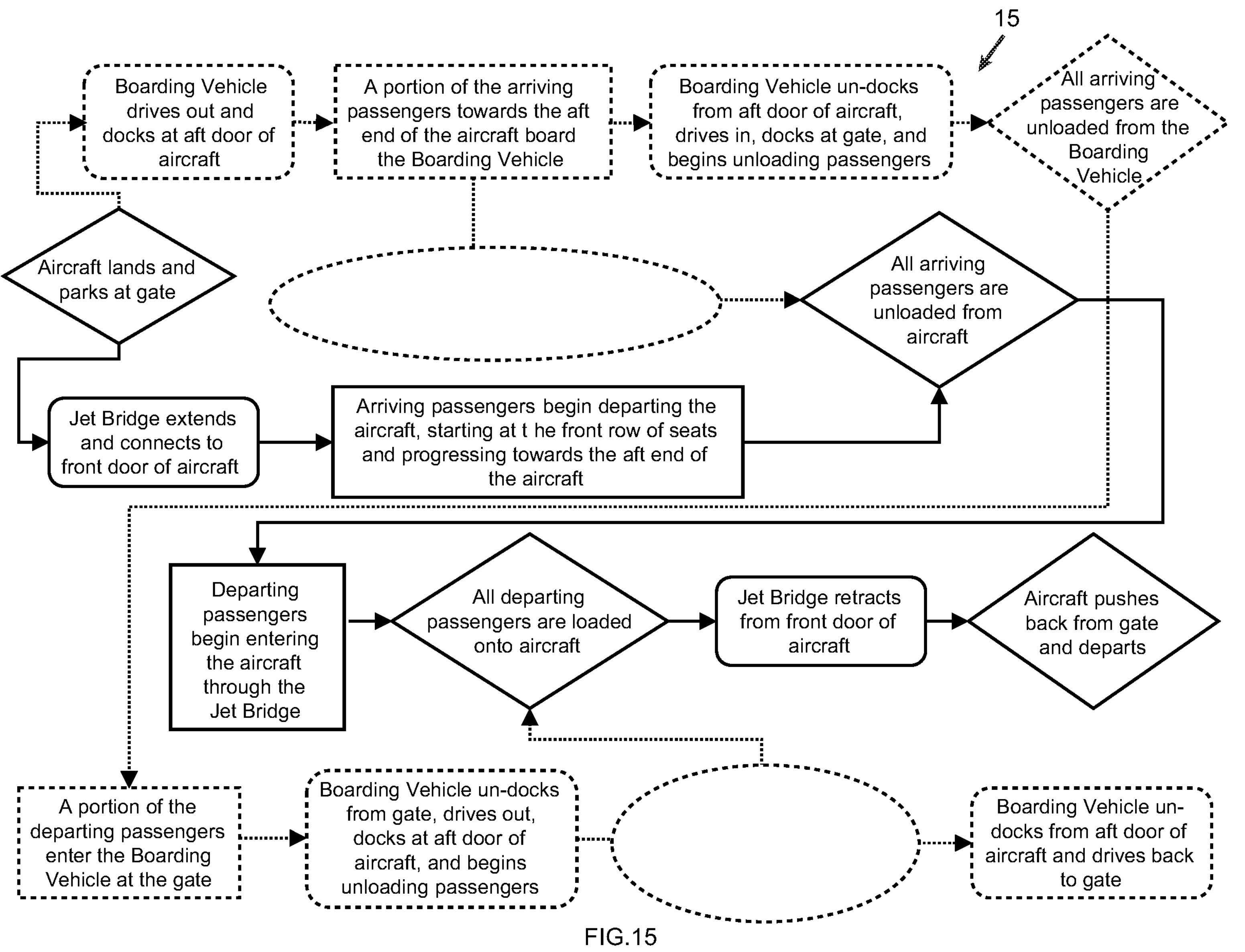
FIG. 15 is a flow diagram of an exemplary embodiment of a method of use of an exemplary embodiment of the aircraft boarding vehicle boarding and deplaning procedure according to select embodiments of the instant disclosure.

Referring now to FIG. 15, by way of example, and not limitation, there is illustrated an example embodiment of a method of use of an exemplary embodiment aircraft boarding vehicle 10, 10A, boarding and deplaning procedure 15. FIG. 15 discloses in dashed lines a complimentary or parallel boarding and deplaning procedure 15 to dramatically speed up the turnaround process during deplaning and boarding procedures of passengers by adding deplaning and boarding procedures via aft door ARD of aircraft AC. This is particularly true for single aisle aircraft by enabling much higher passenger throughput utilizing jet bridge for deplaning and boarding procedures via the front door of the aircraft while simultaneously utilizing aircraft boarding vehicle 10, 10A for deplaning and boarding procedures via the rear or other door of the aircraft, such as aft door AD of aircraft AC.

Figure 16:
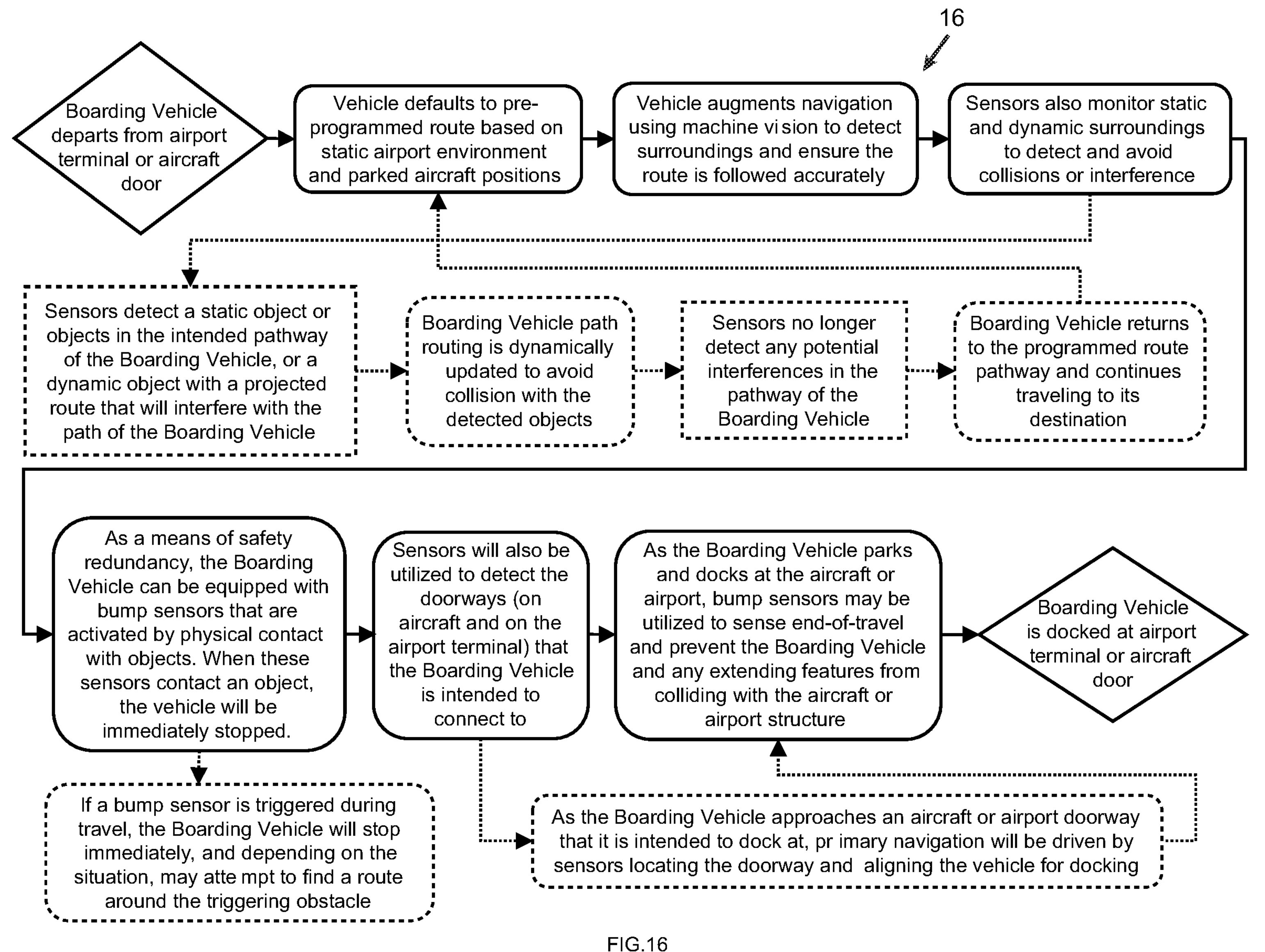
FIG. 16 is a flow diagram of an exemplary embodiment of a method of use of an exemplary embodiment of the aircraft boarding vehicle sensor procedure according to select embodiments of the instant disclosure.

Referring now to FIG. 16, by way of example, and not limitation, there is illustrated an example embodiment of a method of use of an exemplary embodiment of aircraft boarding vehicle 10, 10A, sensors and/or cameras guidance procedure 16. FIG. 16 discloses in dashed lines a procedure for use of sensors and/or cameras 700, or the like to enable aircraft boarding vehicle 10, 10A to detect all its surroundings and autonomously (or with minimal operator input) determine an optimal path or route RT between airport terminal T and aircraft AC for aircraft boarding vehicle 10, 10A to traverse. Moreover, sensors and/or cameras 700 systems also inform the safety features of aircraft boarding vehicle 10, 10A, dynamically adjusting its route RT and drive speed to prevent collisions and avoid hazards during operation.

With respect to the above description then, it is to be realized that the optimum dimensional relationships, to include variations in size, materials, shape, form, position, movement mechanisms, function and manner of operation, assembly and use, are intended to be encompassed by the present disclosure.

The foregoing description and drawings comprise illustrative embodiments. Having thus described exemplary embodiments, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Moreover, the present disclosure has been described in detail, it should be understood that various changes, substitutions and alterations can be made thereto without departing from the spirit and scope of the disclosure as defined by the appended claims. Accordingly, the present disclosure is not limited to the specific embodiments illustrated herein but is limited only by the following claims.

The invention claimed is:

1. An aircraft boarding vehicle to transport passengers between an airport gate area and to a front door or a rear door of an aircraft positioned on a tarmac of an airport without impeding a ground transportation vehicle and airplane traffic, said vehicle comprising:

- a passenger platform having a frame to support said passenger platform;
- a pair of lift mast assemblies configured without a lower horizontal support therebetween, further configured to raise and lower said passenger platform to match a height of the airport gate area and the door of the aircraft and further configured to raise said passenger platform to a height sufficient to traverse over the wing tips of the aircraft to enable the vehicle to reach and dock with the rear door of the aircraft, each said lift mast assembly slidably affixed to said frame on one end;
- a pair of independent turning drive hubs affixed to each of said pair of lift mast assemblies on another end, said turning drive hubs configured to drive in any direction and turn 360 degrees to enable navigation without impeding airplane traffic on the tarmac; and
- a power supply to power said pair of drive hubs and said pair of lift mast assemblies.

2. The aircraft boarding vehicle of claim 1, wherein said passenger platform further comprising a plurality of passenger seating to enable the passengers to sit.

3. The aircraft boarding vehicle of claim 1, wherein said passenger platform further comprising an entertainment system to entertain the passengers.

4. The aircraft boarding vehicle of claim 1, wherein said passenger platform further comprising an aircraft loading door positioned on an end of passenger platform to enable the passenger to deplane and board between the airport gate area and the aircraft.

5. The aircraft boarding vehicle of claim 1, wherein said passenger platform further comprising a terminal boarding vehicle gate positioned on a side of passenger platform to enable the passenger to transition between said passenger platform and the airport gate area.

6. The aircraft boarding vehicle of claim 1, wherein each of said pair of lift mast assemblies further comprising a telescope type lift system having two or more telescopic arms configured to be extended and retracted from within the other.

7. The aircraft boarding vehicle of claim 1, wherein said pair of lift mast assemblies raises said passenger platform to enable the ground transportation vehicles to drive and park underneath.

8. The aircraft boarding vehicle of claim 1, wherein said pair of drive hubs further comprising four bar linkages and hydraulic drives to further raise and lower said passenger platform.

9. The aircraft boarding vehicle of claim 1, wherein said pair of drive hubs further comprising a steering motor having a drive controller, wherein said steering motor engages an energy chain affixed to a rotational drive axis to rotate said turning drive hub.

10. The aircraft boarding vehicle of claim 1, further comprising a guidance system.

11. The aircraft boarding vehicle of claim 10, wherein said guidance system is configured for autonomous movement of said pair of drive hubs in a direction on a route about the tarmac.

12. The aircraft boarding vehicle of claim 11, wherein said guidance system further comprising a sensor.

13. The aircraft boarding vehicle of claim 12, wherein in said sensor is selected from a group comprising of camera, LiDAR system, radar system, shrouded sensing skirt, GPS navigation system, collision avoidance systems and combinations thereof.

14. The aircraft boarding vehicle of claim 10, wherein said guidance system determines a route between the airport gate area and the aircraft.

15. The aircraft boarding vehicle of claim 1, wherein said passenger platform is configured as a lounge space to expand the airport gate area.

16. The aircraft boarding vehicle of claim 1, wherein said power supply further comprising a rechargeable onboard battery.

17. The aircraft boarding vehicle of claim 1, wherein said passenger platform further comprising a climate control system.

18. The aircraft boarding vehicle of claim 1, wherein said ene one pair of lift mast assemblies is configured to lower said passenger platform.

19. The aircraft boarding vehicle of claim 18, wherein said passenger platform further comprising a ramp deployable from said passenger platform.

20. The aircraft boarding vehicle of claim 18, wherein said passenger platform further comprising a staircase deployable from said passenger platform.

21. The aircraft boarding vehicle of claim 1, wherein said pair of lift mast assemblies further comprising a lift system, said lift system is selected from a group comprising hydraulic cylinders, electric motors, pneumatic systems and combinations thereof.

* * * * *